May 30, 1939.  F. LUX  2,160,076

SYNCHRONOUS MOTOR

Filed Aug. 10, 1936

Inventor
Frederick Lux
By Rockwell Bartholow
Attorneys

Patented May 30, 1939

2,160,076

UNITED STATES PATENT OFFICE 2,160,076

SYNCHRONOUS MOTOR

Frederick Lux, Waterbury, Conn., assignor to The Lux Clock Manufacturing Company, Inc., Waterbury, Conn., a corporation of Connecticut Application August 10, 1936, Serial No. 95,090

8 Claims. (Cl. 172—278)

This invention relates to self-starting synchronous electric motors, and more particularly to a hysteresis motor of this type which is of relatively small size and which is adapted for use in a number of relations, such as with electric clocks, measuring devices, recording devices, meters, etc.

One object of the invention is to produce a strong and durable self-starting synchronous motor which will have improved characteristics with respect to similar types of motors now in use.

Another object of the invention is the provision of a motor of the type described which will have a relatively great starting torque and at the same time will be synchronous in operation.

Another object of the invention is the provision of a motor of the type described, which will operate at a relatively low speed.

Other objects of the invention are to provide improved shaft bearings for devices of this character, and to provide an improved method of constructing the gear housing and securing it to the supporting frame of the motor.

To these and other ends the invention consists in the novel features and combinations of parts to be hereinafter described and claimed.

Figure 1:
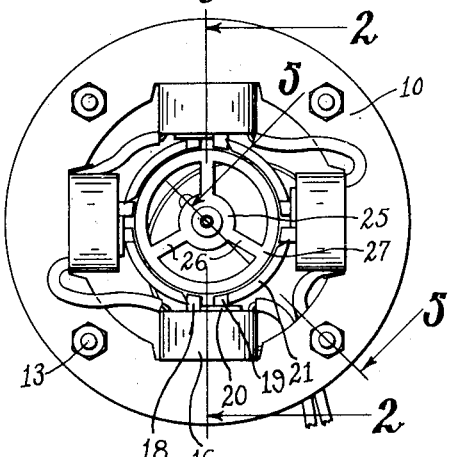
Fig. 1 is a front elevational view of an electric motor embodying my improvements.
Figure 2:
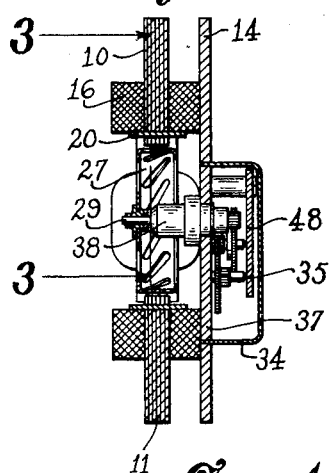
Fig. 2 is a sectional view on line 2—2 of Fig. 1.

To illustrate a preferred embodiment of my invention I have shown a field core 10 comprising a series of laminated sections 11 placed flatwise together in the usual manner. These sections are generally of ring shape, as shown more especially in Figs. 1 and 3, and are provided at spaced points with inwardly and radially extending pole pieces 12. The number of these pole pieces may, of course, be varied according to the characteristics desired of the motor, there being four of such parts in the illustrated embodiment.

The laminated sections 11 are held together by means of the bolts 13, which pass through the sections and also serve to secure the field to a frame or support member 14, there being spacing members 15 placed upon these bolts between the field magnet and the supporting member.

Windings or coils 16 are placed about the pole members 12, and the adjacent coils will be wound in opposite directions, so that the free ends of the adjacent pole members are of opposite polarity when energized by a current passing through the coils. It will also be noted that the inner ends of the pole pieces are bifurcated, providing a recess 17 separating the spaced poles 18 and 19, the recess serving to accommodate a shading coil 20 about the pole end 19. We may, therefore, speak of the pole 19 as the shaded pole and the pole 18 as the unshaded pole.

Bridge members 21 extend between adjacent pole members, contacting at one end with a shaded pole 19 and at the other end with an unshaded pole 18. While these members serve as bridge members in that they by-pass a certain amount of magnetic flux from one pole to the other so that this flux does not pass through the rotor, they also serve as extensions of the shaded poles, as will be explained.

These bridge members may be made of soft steel, and are of arcuate shape and of considerable area in cross-section. It will be noted, as shown more particularly in Fig. 3, that the end of the bridge member 21 adjacent the shaded pole 19 contacts flatly over its entire area with this pole. At the other end, however, the bridge member is wedge-shaped at its end, as shown at 22, and provided with a relatively sharp edge which may conveniently be disposed in a small notch 23 formed laterally in the unshaded pole. This provides for a contact of reduced area between the unshaded pole and the bridge member 21, so as to provide a reluctance at this point which serves to reduce the amount of magnetic flux by-passed about the rotor. Also by providing a greater area of contact between the shaded pole and the bridge member than between this member and the unshaded pole, this member serves as an extension of the shaded pole and serves to carry the flux of the latter pole. It may also be observed that the effect of such construction is different from that which would be obtained if the shaded pole were merely made of larger area than the unshaded pole, for in such case the shading coil will usually surround the entire pole and the strength of the flux over the whole area of the pole will be constant. In the present case, however, where an extension is provided upon the pole beyond the shading coil, the strength of the flux probably tapers off throughout this extension or bridge member, and gradually becomes weaker as the distance from the pole becomes greater.

Figure 3:
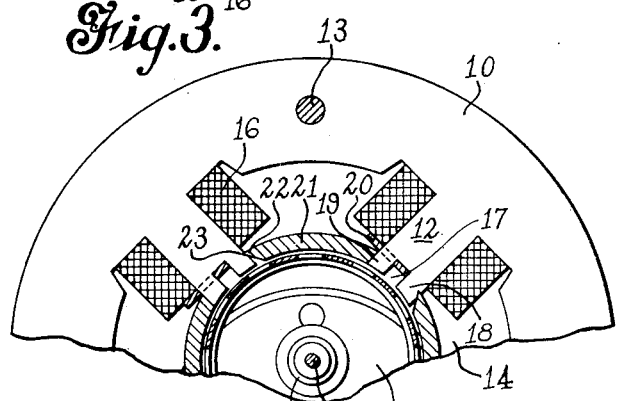
Fig. 3 is a partial sectional view on line 3—3 of Fig. 2.
Figure 4:
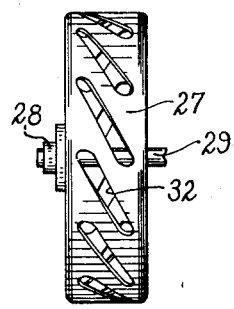
Fig. 4 is a plan view of the rotor.
Figure 5:
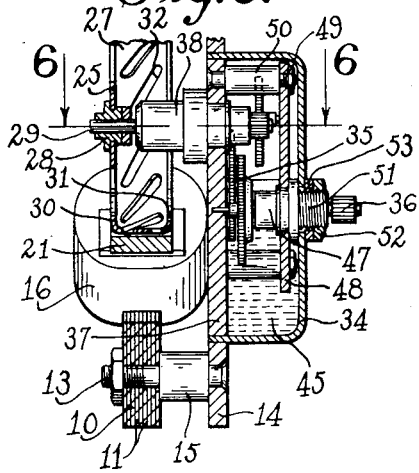
Fig. 5 is a sectional view on line 5—5 of Fig. 1, this view being enlarged to show various parts of the apparatus in greater detail.
Figure 6:
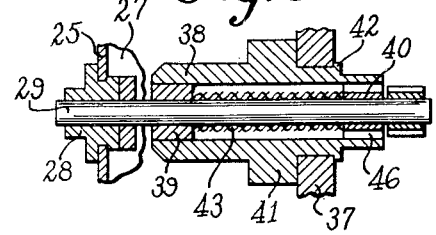
Fig. 6 is a sectional view through the bearing of the rotor shaft taken on line 6—6 of Fig. 5.

The rotor, as shown more particularly in Figs. 1, 3 and 5, comprises a ring member 25 carrying radial spokes 26 to the outer ends of which is secured a drum 27. The ring member 25 is secured to a hub 28, which in turn is secured to the rotor shaft. 29. It will be apparent from Figs. 4 and 5 that the drum member 27 of the rotor is relatively wide, being substantially the same width as the bridge members 21 and slightly wider than the thickness of the field magnet. Also at each edge the drum member is slightly cupped or turned over to provide peripheral flanges 30 and 31.

The rim or drum member of the rotor is provided with a series of helical slots 32, there being 12 of such slots in the particular motor illustrated herein, and it will also be noted that the ends of said slots have a slight overlapping relation circumferentially of the drum, that is to say, any line drawn across the surface of the drum parallel to the rotor axis will intersect at least one of the slots. The slots give the rotor its synchronous characteristics, and, when helically disposed in this manner, the rotor will be self-starting, and it has also been found advantageous to provide them of the proper angle and length so that there will be the slight overlapping referred to. The drum of the rotor is of hardened magnetic material such as magnetic steel, while the spokes are soft, so that the latter will not have the characteristics of a permanent magnet and merely provide the support for the drum-shaped rotor.

To a supporting member 14 is secured a gear case 34 containing suitable gearing 35 which it is not necessary to describe in detail, this gearing constituting a reducing gearing connecting the motor shaft 29 with the power outlet shaft 36. The gear casing and associated parts are secured in place in a novel way which will now be described. A circular disk-shaped portion 37 is cut from the member 14. The opening left by cutting out this disk-shaped member is then slightly enlarged. The member 37 is then inserted into the mouth of the cup-shaped gear housing 34, in which it makes a tight fit. This edge of the gear housing is then pressed tightly in the opening in the member 14, thus securing the parts effectively together without the employment of solder or like material for this purpose. Prior to the assembly of these parts the motor shaft, the power outlet shaft and associated gearing are secured in place to the member 37.

Secured in an opening in the disk 37 is a hollow bearing sleeve or housing 38, having adjacent its ends bushings 39 and 40 providing bearings for the rotor shaft 29. The sleeve 38 is provided with a shoulder portion 41 upon one side of the member 17, and the metal of the sleeve is upset, as shown at 42, at the other side of this member to secure the sleeve in place and to make a tight joint between the sleeve and the member 37 to prevent the escape of oil. A packing sleeve 43 of fabric or suitable oil absorbent material may be disposed about the rotor shaft 29 within the sleeve 38 in order to keep the shaft lubricated. A supply of oil 45 is placed within the gear case 34, and this oil is carried by the gearing and shaft 29 into the sleeve 38 to saturate the packing 43. The bearing 40 at the inner end of the sleeve 38 is provided with a number of axial openings 46, so that any excess oil dripping from the packing 43 will flow back through these openings into the gear casing, which serves as a reservoir for the oil. In this manner the oil will be prevented from working out through the sleeve 39 about the shaft 29. The power outlet shaft is mounted in a bearing 47 constructed similarly to the bearing sleeve 38. This sleeve 47 is mounted in a plate 48 secured to the portion 37 of the plate 14 by the studs or bolts 49 and spacing members 50. The outer end 51 of sleeve 47 is threaded and receives a nut 52 which compresses the washer 53 against the surrounding portion of the gear case 34 in order to prevent escape of oil about the sleeve 47. As the bearings for the shaft 36 within this sleeve are constructed similarly to those of the shaft 29, it will be seen that escape of oil from the gear casing is effectively prevented, for the oil cannot escape about either of the bearing sleeves, and all that enters the sleeve will be returned to the gear casing through the openings in the inner bearing bushings.

Self-starting synchronous motors usually fall into one of two classes. They are either so-called induction motors or hysteresis motors. The induction motor is usually characterized by the fact that short-circuited non-magnetic, usually copper, conductors are placed in the rotor, which conductors are acted upon by the shifting field to produce a starting or accelerating torque, and the rotor is also usually provided with projections or teeth forming geometrical poles which are acted upon by the alternations of the field to hold the rotor in synchronism, and the starting action depends upon the current induced in the conducting material in the rotor.

The present motor distinguishes from the induction type motors in that it has no copper or other conducting material in the rotor, and does not depend for its operation upon a flow of current in the rotor, which, in the present instance, comprises a hardened steel cylinder or drum having diagonal slots across its peripheral surface.

Magnetic poles are produced in this rotor by the current in the stationary field structure. As the magnetism in the stationary field structure shifts from the unshaded to the shaded poles, the magnetic poles in the rotor tend to shift likewise. The tendency of the hardened steel rotor to resist shifting of its magnetic poles, which is called hysteresis or remanence, produces a torque even when the rotor is stationary. If the motor is permitted to run, this torque continues to exist up to that speed at which a point on the rotor is carried from the shaded to the unshaded pole in time with the shift of the flux between them. The synchronous speed at which the motor tends to operate is determined by the arrival of the magnetized poles or spots on the rotor, underneath the stator poles in time with the alternations in current in the latter. This may be a different speed from the speed determined by the shifting flux, and if so, it is sometimes called a sub-synchronous speed.

The load which such a motor will carry at its synchronous operating speed is determined by the force necessary to shift the permanently magnetized spot in the rotor iron, so that the more firmly these magnetized spots are held in place, the greater will be the operating torque of the motor. However, it is important that the shift of the magnetized spots during starting is not entirely prevented, for greater starting torque is obtained if the spots are free to shift to some extent. If, for example, the magnetized spots in a hard steel rotor were rigidly held, then the spot which became magnetized underneath the unshaded pole of a field when the motor was at rest could not move toward the shaded pole as the field shifts, as the shifting field quickly moves so far away from the magnetized spot as to have very little effect upon it. If the magnetized spot is permitted to shift in the iron of the rotor, and follow to some extent the shifting field from the unshaded to the shaded pole, there will be a strong force acting upon it, and it will pull or draw the rotor with a force depending upon the degree to which the rotor iron resists the motion of the magnetized spot in itself, or the force due to hysteresis or remanence.

The provision of the diagonal slots in the rotor illustrated serves to permit a certain amount of movement of the magnetized spots in the rotor, while at the same time limiting this movement or preventing the free movement of these spots so that a high starting or accelerating torque will be present. At the same time the rotor will have no pronounced geographical poles (although it will develop polarity to some extent, probably in the strips between the rotor slots), and so will be held to a synchronous speed below that of the maximum speed which would be produced by the starting torque alone.

As is well known, the presence of the conducting material or shading rings about the shaded portion of one of the pole ends tends to reduce the value of the flux in this pole end below that in the unshaded pole. It is desirable, however, to make the flux in the shaded portion of the pole as strong as possible. This is accomplished in the present instance by providing an extension to the face of the shaded pole in the form of the strap or bridge member 21, which extends from the shaded portion of one pole member to the unshaded portion of the adjacent pole member. It will be noted, however, that this bridge member has a more intimate contact with the shaded pole than with the unshaded pole, thus providing a reluctance at the latter end, so that the bridge member will be of the same magnetic polarity as the shaded pole, and not be affected by the magnetism in the unshaded portion of the next adjacent pole member.

Tests have shown that a motor constructed in accordance with the principles outlined has a relatively high starting torque, and will carry a relatively large load at its synchronous speed. Moreover, it is of simple construction and can be manufactured at a relatively low cost. The motor shown will run synchronously at a speed of 600 revolutions per minute, which is a relatively slow speed, and when used as a clock motor, for example, to drive the second hand of a clock, it does not require as great reduction in gearing as the usual clock motor which runs at a higher speed.

While I have shown and described a preferred embodiment of my invention, it will be understood that it is not to be limited to all of the details shown, but is capable of modification and variation within the spirit of the invention and within the scope of the appended claims.

What I claim is:

1. A self-starting synchronous motor of the hysteresis type having a stator provided with shaded and unshaded poles for producing a pulsating and shifting field, bridge members between said poles carrying the flux of the shaded poles, a rotor operating in said field made wholly of remanent magnetic material whereby magnetized spots are produced therein, said rotor being of hollow cylindrical form, the remanence of the material of the rotor offering resistance to the shifting of said spots, and said rotor being provided with an annular series of openings between the edges thereof to additionally limit the shifting of said spots, said openings comprising closed helically arranged slots extending in a generally axial direction.

2. A self-starting synchronous motor of the hysteresis type having means for producing a pulsating and shifting field, a rotor operating in said field made wholly of remanent magnetic material whereby magnetized spots are produced therein, and said rotor comprising a cylindrical band of material supported from the rotor axis, said band having a series of helical slots formed therein, the ends of said slots being in overlapping relation one with another.

3. A synchronous motor of the hysteresis type having a stator field providing pulsating and shifting components of flux, a rotor mounted to rotate in said field and responsive to both flux components, said field comprising a plurality of pole members each having shaded and unshaded poles, a bridge member extending from a shaded pole of one pole member to the unshaded pole of an adjacent pole member, said bridge member contacting with both said poles, and means providing a reluctance at the point of contact of the bridge member with the unshaded pole whereby the latter serves as an extension of the shaded pole.

4. A synchronous motor of the hysteresis type having a stator field providing pulsating and shifting components of flux, a rotor mounted to rotate in said field and responsive to both flux components, said field comprising a plurality of pole members each having shaded and unshaded poles, a bridge member extending from a shaded pole of one pole member to the unshaded pole of an adjacent pole member, said bridge member contacting with both said poles but making a more intimate contact with the shaded than with the unshaded pole, whereby the bridge member carries the flux of the shaded pole.

5. A synchronous motor of the hysteresis type having a stator field providing pulsating and shifting components of flux, a rotor mounted to rotate in said field and responsive to both flux components, said field comprising a plurality of pole members each having shaded and unshaded poles, a bridge member extending from a shaded pole of one pole member to the unshaded pole of an adjacent pole member, said bridge member contacting with both said poles but being reduced in size at its end contacting with the unshaded pole to provide reluctance at this point, whereby the bridge member carries the flux of the shaded pole.

6. A self-starting synchronous motor of the hysteresis type having a stator field providing rotating and shifting components of flux, a rotor mounted to rotate in said field and responsive to both flux components, said field comprising a plurality of pole members each having shaded and unshaded poles, a member extending from a shaded pole to an unshaded pole to carry the flux of the shaded pole and to by-pass a part of the flux from one of said poles to the other, said rotor comprising a cylindrical band of remanent magnetic material having unbroken edges, and said rotor having helically directed slots formed in the material thereof, there being a series of such slots extending around the rotor.

7. A rotor for a self-starting synchronous motor of the hysteresis type, said rotor being of hollow cylindrical form and consisting of a pair of continuous end rings joined by helically disposed strips of material providing helically disposed slots between said strips, said rotor being composed wholly of magnetic material.

8. A synchronous motor of the hysteresis type having a stator field providing pulsating and shifting components of flux, said field comprising a plurality of pole members each having shaded and unshaded poles, a bridge member of arcuate shape extending from a shaded pole to an adjacent unshaded pole adjacent the inner ends thereof to by-pass magnetic flux from one pole to the other and to serve as an extension of the shaded pole, a rotor operating in said field made wholly of remanent magnetic material, said rotor comprising a cylindrical band of material having unbroken side edges and an annular series of openings provided in said band between the edges thereof.

FREDERICK LUX.